US009007630B2

(12) United States Patent
Park

(10) Patent No.: US 9,007,630 B2
(45) Date of Patent: Apr. 14, 2015

(54) ELECTRONIC APPARATUS, CLOUD SERVER, AND METHOD OF CONTROLLING PRINTING THEREOF

(71) Applicant: Samsung Electronics Co., Ltd., Suwon-si, Gyeonggi-do (KR)

(72) Inventor: Chang-soo Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 92 days.

(21) Appl. No.: 13/667,836

(22) Filed: Nov. 2, 2012

(65) Prior Publication Data

US 2013/0114107 A1 May 9, 2013

(30) Foreign Application Priority Data

Nov. 3, 2011 (KR) .................... 10-2011-0114191

(51) Int. Cl.
*G06F 3/12* (2006.01)

(52) U.S. Cl.
CPC .............. *G06F 3/1204* (2013.01); *G06F 3/122* (2013.01); *G06F 3/1226* (2013.01); *G06F 3/1232* (2013.01); *G06F 3/1247* (2013.01); *G06F 3/1287* (2013.01); *G06F 3/1289* (2013.01); *G06F 3/1292* (2013.01)

(58) Field of Classification Search
USPC ........ 358/1.14, 1.15, 1.6, 468, 445, 443, 471, 358/400, 401, 404; 709/249
See application file for complete search history.

(56) References Cited

U.S. PATENT DOCUMENTS

| 8,621,110 | B2 * | 12/2013 | Okabe ........................... 709/249 |
| 2008/0068649 | A1 * | 3/2008 | Emori ........................... 358/1.15 |
| 2013/0163027 | A1 * | 6/2013 | Shustef ........................ 358/1.14 |

* cited by examiner

*Primary Examiner* — Jerome Grant, II
(74) *Attorney, Agent, or Firm* — Staas & Halsey LLP

(57) ABSTRACT

An electronic apparatus is provided, which includes a searching unit searching for image forming devices to which the electronic apparatus is connectable, a user interface unit receiving a selection of an image forming device, by which a printing job is to be performed, of the searched image forming devices and receiving a selection of a document file, of which the printing job is to be performed, of document files stored in a cloud server, an updating unit receiving device information of the selected image forming device from the selected image forming device and updating device information of image forming devices pre-registered in the cloud server using the received device information of the image forming device, and a communication interface unit receiving print data of the selected document file from the cloud server and transferring the received print data to the selected image forming device.

35 Claims, 11 Drawing Sheets

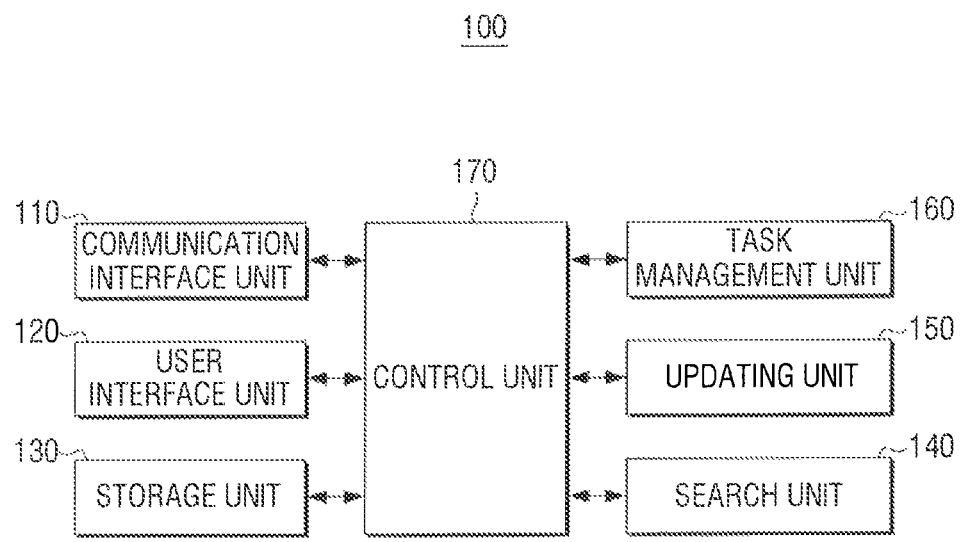
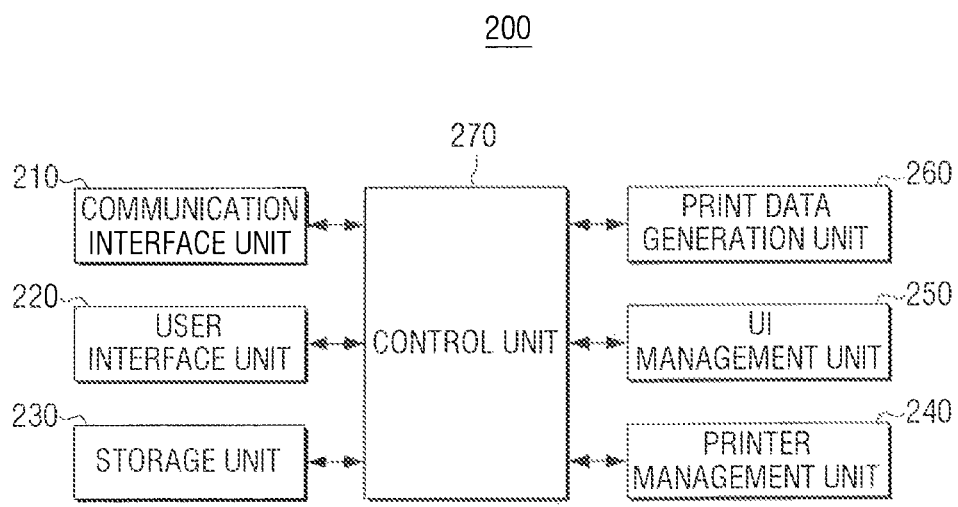

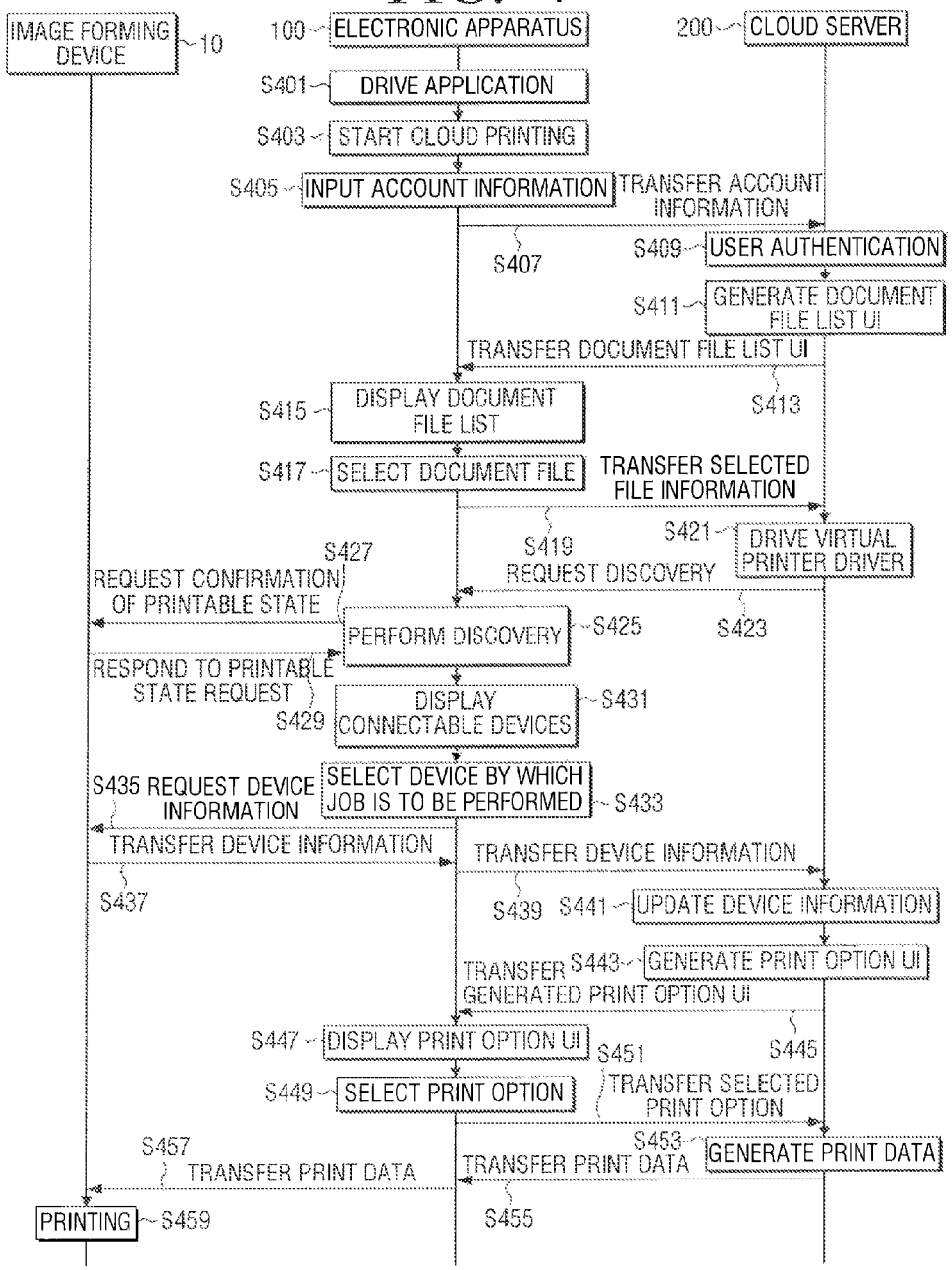

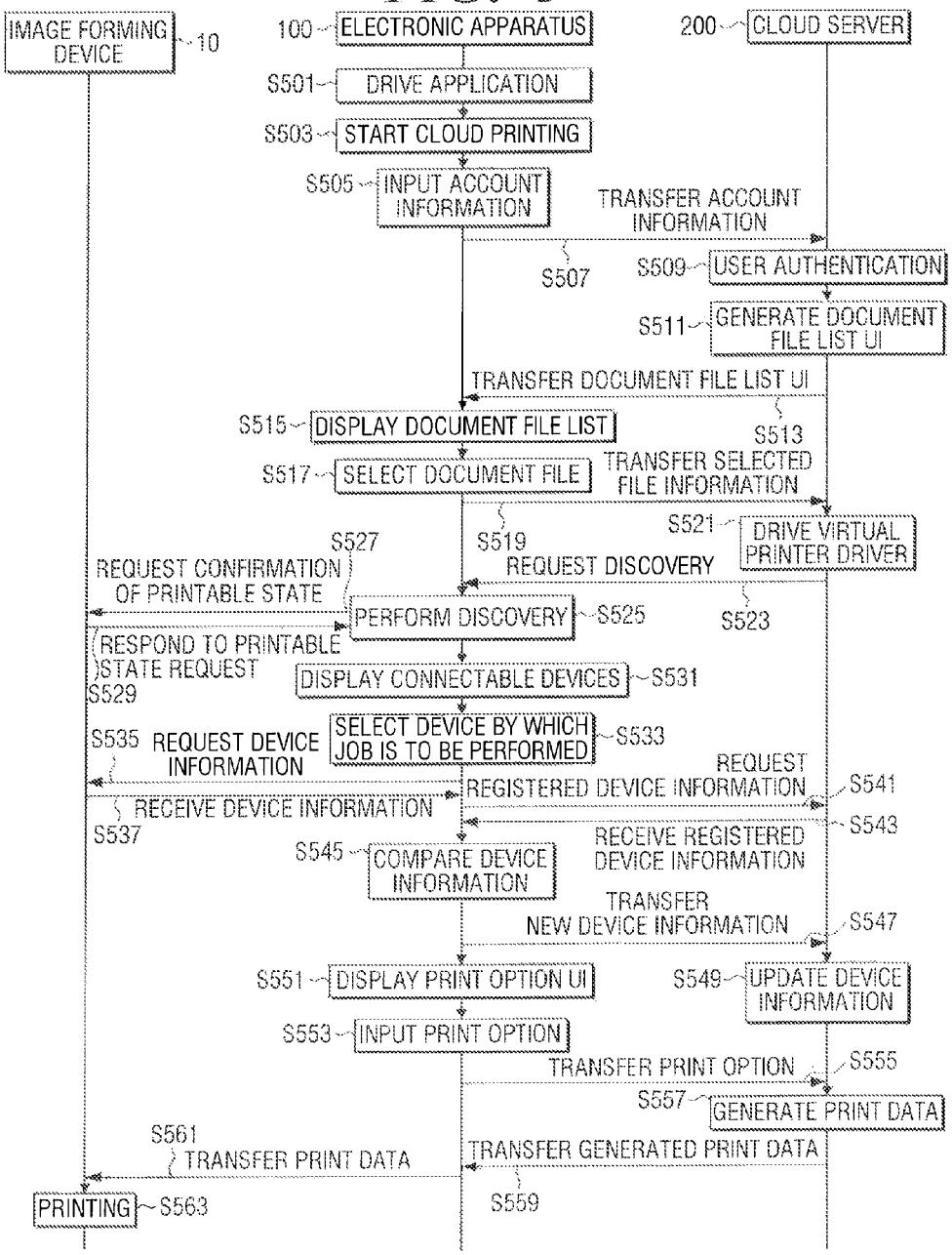

FIG. 6

| MOBILE DEVICE INFORMATION | USER INFORMATION | color mode | Paper Tray | Duplex | HDD | Paper Size | Staple | PRINTER INFORMATION | PRINTER MODEL INFORMATION |
|---|---|---|---|---|---|---|---|---|---|
| SN100A | User 1 | Color, mono | Tray1, Tray2 | ON | OFF | A4 | OFF | Proxy | CLX-AA |

300

ELECTRONIC APPARATUS, CLOUD SERVER, AND METHOD OF CONTROLLING PRINTING THEREOF

CROSS-REFERENCE TO RELATED APPLICATIONS

This application claims priority under 35 U.S.C. §119(a) from Korean Patent Application No. 2011-0114191, filed on Nov. 3, 2011, in the Korean Intellectual Property Office, the contents of which are incorporated herein by reference in its entirety.

BACKGROUND

1. Field of the General Inventive Concept

The general inventive concept relates to an electronic apparatus, a cloud server, and a method for controlling printing thereof, and more particularly to an electronic apparatus, a cloud server, and a method for controlling printing thereof.

2. Description of the Related Art

In general, an image forming device includes a device that prints print data generated by a terminal device such as a computer on a recording paper. Examples of such an image forming device may be a copy machine, a printer, a facsimile, and a multifunction peripheral (MFP) in which functions of the above-described devices are combined through one device.

Recently, as cloud computing is applied to a terminal device such as a computer, the terminal device does not directly perform a printing job, but a server that stores information performs the printing job. Here, "cloud computing" means a computer environment in which information is stored in a server on the Internet, but is temporarily stored in a terminal device.

In order to perform a printing process in such a cloud computer environment, a user registers device information of an image forming device in a cloud server before performing the printing job. However, in order for the user to perform the printing job in another image forming device after the device information of the image forming device is registered, the user is required to change the device information pre-registered in the cloud server to the device information of the other image forming device that is to perform the current printing job one by one which is inconvenient to the user.

Further, if the printing job is performed in a state where it is not known that the device information registered in the cloud server is different from the currently connected image forming device, it is necessary for the electronic apparatus to additionally change the print data that is received from the cloud server to match the image forming device that performs the current printing job.

SUMMARY

The present general inventive concept provides an electronic apparatus, a cloud server, and a method to control printing thereof, which can synchronize device information of an image forming device registered in a cloud server with device information of an image forming device connected to the current electronic apparatus in a process of printing a file of the cloud server.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an electronic apparatus which includes a searching unit to search for image forming devices to which the electronic apparatus is connectable; a user interface unit receiving a selection of an image forming device, by which a printing job is to be performed, of the searched image forming devices, and receiving a selection of a document file, of which the printing job is to be performed, of document files stored in a cloud server; an updating unit receiving device information of the selected image forming device from the selected image forming device, and updating device information of image forming devices pre-registered in the cloud server using the received device information of the image forming device; and a communication interface unit receiving print data of the selected document file from the cloud server, and transferring the received print data to the selected image forming device.

It is preferable that the print data is at least one of a web page file, a PDF (Portable Document Format) file, and an image file.

It is preferable that the device information is information related to functions of the image forming device.

It is preferable that the communication interface unit receives a document file list that corresponds to a user account of the electronic apparatus, and the user interface unit displays the received document file list and receives a selection of at least one of document files in the displayed document file list as the document file of which the printing job is to be performed.

The updating unit may receive the device information pre-registered in the cloud server, compare the device information received from the selected image forming device with the pre-registered device information, and if the device information of the selected image forming device is different from the pre-registered device information, transfer the device information of the selected image forming device to the cloud server, and change the device information pre-registered in the cloud server to the device information of the selected image forming device.

The updating unit may transfer the device information of the selected image forming device to the cloud server so that the cloud server updates the device information pre-registered in the cloud server according to the device information of the selected image forming device.

The electronic apparatus according to the foregoing and/or other features and utilities of the present general inventive concept may further include a task management unit receiving a selection of a print option to be applied to the selected document file and transferring the selected print option to the cloud server.

If a print option list that is applicable to the selected image forming device is received from the cloud server, the task management unit may control the user interface unit to display the received print option list, and receive a selection of at least one of print options in the displayed print option list as the print option to be applied to the selected document file.

The task management unit may control the user interface unit to display the print option list that is applicable to the selected image forming device using the device information of the selected image forming device, and receive a selection of at least one of print options in the displayed print option list as the print option to be applied to the selected document file.

The foregoing and/or other features and utilities of the present general inventive concept may also be achieved by providing a cloud server which includes a storage unit storing document files; a communication interface unit receiving a selection of a document file, of which a printing job is to be performed, of the stored document files from an electronic apparatus, and receiving device information of image forming devices that are connectable to the electronic apparatus; a printer management unit updating pre-registered device information using the received device information of the image forming device; a print data generation unit generating print data of the selected document file using the updated device information; and a control unit controlling the communication interface unit to transfer the generated print data to the electronic apparatus.

It is preferable that the print data generation unit converts the selected document file into at least one of a web page file, a PDF file, and an image file.

It is preferable that the device information is information related to functions of the image forming device.

The cloud server according to the foregoing and/or other features and utilities of the present general inventive concept may further include a UI generation unit generating a document file list that corresponds to a user account of the electronic apparatus, and it is preferable that the communication interface unit transfers the generated document file list to the electronic apparatus and receives a selection of at least one of the document files in the transferred document file list as the document file of which the printing job is to be performed.

It is preferable that the printer management unit changes the pre-registered device information to the received device information of the image forming device if the received device information of the image forming device is different from the pre-registered device information.

The communication interface unit may receive information on a print option to be applied to the selected document file, and the print data generation unit may generate the print data through reflecting the received information on the print option therein.

The cloud server according to the foregoing and/or other features and utilities of the present general inventive concept may further include a UI management unit generating an applicable print option list on the basis of the updated device information of the image forming device, wherein the communication interface unit transfers the generated print option list to the electronic apparatus and receives at least one of the print options in the transferred print option list as the print option to be applied to the selected document file.

The foregoing and/or other features and utilities of the present general inventive concept may also be achieved by providing a method to control printing in an electronic apparatus, which includes receiving a selection of a document file, of which a printing job is to be performed, of document files stored in a cloud server; searching for image forming devices to which the electronic apparatus is connectable; receiving a selection of an image forming device, by which the printing job is to be performed, of the searched image forming devices; receiving device information of the selected image forming device; updating device information of image forming devices pre-registered in the cloud server using the received device information of the image forming device; receiving print data of the selected document file from the cloud server; and transferring the received print data to the selected image forming device.

It is preferable that the print data is at least one of a web page file, a PDF file, and an image file.

It is preferable that the device information is information related to functions of the image forming device.

The method to control printing in an electronic apparatus according to the foregoing and/or other features and utilities of the present general inventive concept may further include receives a document file list that corresponds to a user account of the electronic apparatus; and displaying the received document file list and receives a selection of at least one of document files in the displayed document file list, wherein the step of receiving a selection of the document file receives at least one of the displayed document files as the document file of which the printing job is to be performed.

The step of updating may include receiving the device information pre-registered in the cloud server; comparing the device information received from the selected image forming device with the pre-registered device information; and if the device information of the selected image forming device is different from the pre-registered device information, transferring the device information of the selected image forming device to the cloud server, and changing the device information pre-registered in the cloud server to the device information of the selected image forming device.

The step of updating may transfer the device information of the selected image forming device to the cloud server so that the cloud server updates the device information pre-registered in the cloud server according to the device information of the selected image forming device.

The method to control printing in an electronic apparatus according to the foregoing and/or other features and utilities of the present general inventive concept may further include receiving a selection of a print option to be applied to the selected document file; and transferring the selected print option to the cloud server.

The method to control printing in an electronic apparatus according to the foregoing and/or other features and utilities of the present general inventive concept may further include receiving a print option list that is applicable to the selected image forming device from the cloud server; and displaying the received print option list, wherein the step of receiving a selection of the print option receives a selection of at least one of print options in the displayed print option list as the print option to be applied to the selected document file.

The method to control printing in an electronic apparatus according to the foregoing and/or other features and utilities of the present general inventive concept may further include displaying the print option list that is applicable to the selected image forming device using the received device information of the image forming device, wherein the step of receiving a selection of the print option receives a selection of at least one of print options in the displayed print option list as the print option to be applied to the selected document file.

The foregoing and/or other features and utilities of the present general inventive concept may also be achieved by providing a method to control printing in a cloud server, which includes receiving a selection of a document file, of which a printing job is to be performed, of document files pre-stored in the cloud server from an electronic apparatus; receiving device information of image forming devices that are connectable to the electronic apparatus; updating pre-registered device information using the received device information of the image forming device; generating print data of the selected document file using the updated device information; and transferring the generated print data to the electronic apparatus.

It is preferable that the step of generating the print data converts the selected document file into at least one of a web page file, a PDF file, and an image file.

It is preferable that the device information is information related to functions of the image forming device.

The method to control printing in a cloud server according to the foregoing and/or other features and utilities of the present general inventive concept may further include generating a document file list that corresponds to a user account of the electronic apparatus; and transferring the generated document file list to the electronic apparatus, wherein the step of receiving a selection of the document file receives a selection of at least one of the document files in the transferred document file list as the document file of which the printing job is to be performed.

It is preferable that the step of updating changes the pre-registered device information to the received device information of the image forming device if the received device information of the image forming device is different from the pre-registered device information.

The method to control printing in a cloud server according to the foregoing and/or other features and utilities of the present general inventive concept may further include receiving information on a print option to be applied to the selected document file, wherein the step of generating the print data generates the print data through reflecting the received information on the print option therein.

The method to control printing in a cloud server according to the foregoing and/or other features and utilities of the present general inventive concept may further include generating an applicable print option list on the basis of the updated device information of the image forming device; and transferring the generated print option list to the electronic apparatus, wherein the step of receiving the information on the print option receives at least one of the print options in the transferred print option list as the print option to be applied to the selected document file.

The foregoing and/or other features and utilities of the present general inventive concept may also be achieved by providing a computer readable recording medium including a program to execute a method to control printing in an electronic apparatus, wherein the method to control printing includes receiving a selection of a document file, of which a printing job is to be performed, of document files stored in a cloud server; searching for image forming devices that are connectable to the electronic apparatus; receiving a selection of an image forming device, by which the printing job is to be performed, of the searched image forming devices; receiving device information of the selected image forming device; updating device information of image forming devices pre-registered in the cloud server using the received device information of the image forming device; receiving print data of the selected document file from the cloud server; and transferring the received print data to the selected image forming device.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 2 is a block diagram illustrating the detailed configuration of an electronic apparatus in FIG. 1;

FIG. 3 is a block diagram illustrating the detailed configuration of a cloud server in FIG. 1;

FIG. 4 is a sequence diagram illustrating the operation of a printing system according to an exemplary embodiment of the present general inventive concept;

FIG. 5 is a sequence diagram illustrating the operation of a printing system according to an exemplary embodiment of the present general inventive concept;

FIG. 6 is a diagram illustrating an example of device information according to an embodiment of the present general inventive concept;

DETAILED DESCRIPTION OF THE EXEMPLARY EMBODIMENTS

Figure 1:
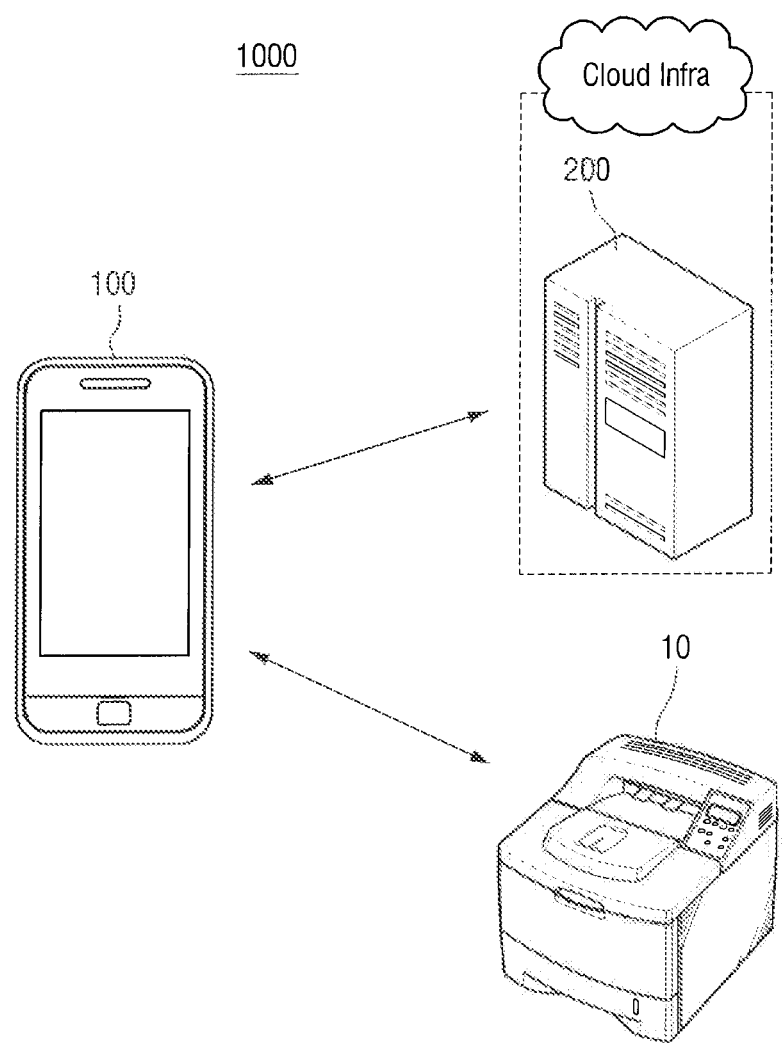
FIG. 1 is a diagram illustrating a printing system according to an exemplary embodiment of the present general inventive concept.

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

FIG. 1 is a diagram illustrating a printing system according to an exemplary embodiment of the present general inventive concept.

Referring to FIG. 1, a printing system 1000 includes an image forming device 10, an electronic apparatus 100, and a cloud server 200.

The electronic apparatus 100 may perform a printing job using the image forming device 10. The electronic apparatus may include, but is not limited to, a mobile terminal, such as a mobile telephone, tablet, PC, and the like. Specifically, the electronic apparatus 100 may search for surrounding image forming devices, receive a selection of an image forming device by which a printing job is to be performed, among the searched image forming devices, and perform the printing job using the selected image forming device. At this time, the electronic apparatus 100 may transfer print data to be printed by the selected image forming device 10. The data may include, but is not limited to, a web page file, an image file, and a PDF file. Upon receiving the print data, the image forming device 10 may perform a print job of the corresponding print data. In at least one exemplary embodiment, the print data may be printed using a direct printing method. That is, the print data may be directly sent to the image forming device 10 where it is processed/converted for printing without further conversion by a printer driver included in a host computer and/or device generating the print data.

With respect to a document file (or print file) except for the above-described web page file, image file and PDF file, the electronic apparatus 100 may transfer the document file to a cloud server 200, receive print data that corresponds to the document file from the cloud server 200, and transfer the received print data to the image forming device 10 to perform the printing job.

Further, the electronic apparatus 100 may perform printing job of a document file that is stored in the cloud server 200. Specifically, the electronic apparatus 100 may select a document file, of which a printing job is to be performed, of document files stored in the cloud server 200, receive print data that corresponds to the selected document file from the cloud server 200, and transfer the received print data to the image forming device 10 using the direct printing method to perform the printing job of the document file stored in the cloud server 200.

In addition, the electronic apparatus 100 may update device information that is pre-registered in the cloud server 200 using device information that is received from the image forming device 10. Specifically, the electronic apparatus 100 may receive the device information from the image forming device 10, receive the pre-registered device information from the cloud server 200, and if the two device information received are different from each other, change the device information pre-registered in the cloud server 200 to the device information received from the image forming device 10. Here, the device information is information related to functions of the image forming device 10, and may be information as illustrated in FIG. 6. The device information may be actual device information that is actually stored in an image forming device 10 connectable to the electronic apparatus 100. The detailed configuration and operation of the electronic apparatus 100 will be described later with reference to FIG. 2. Here, the electronic apparatus 100 includes, but is not limited to, a desktop computer, a notebook computer, a tablet, a mobile phone, a personal media player (PMP), and an MP3 player.

The cloud server 200 stores the pre-registered device information of image forming devices.

Further, the cloud server 200 may convert a document file into print data. Specifically, the cloud server 200 may convert a document file stored in the cloud server 200 and/or a document file received from the electronic apparatus 100 into print data using an internal virtual printer driver and the pre-registered device information.

Further, the cloud server 200 may transfer the converted print data to the electronic apparatus 100. The detailed configuration and operation of the cloud server 200 will be described later with reference to FIG. 3.

The image forming device 10 is connected to the electronic apparatus 100, and may receive print data, such as a web page file, a PDF file, or an image file, from the electronic apparatus 100 and perform the printing job thereof. Further, the image forming device 10 may transfer its own device information to the electronic apparatus 100. Here, the image forming device 10 is not limited to a printer that can perform printing job, but may also include a multifunction peripheral that is capable of performing scanning and/or copying functions in addition to executing the printing job.

As described above, the printing system 1000 according to at least one exemplary embodiment updates the device information pre-registered in the cloud server 200 on the basis of the device information of the image forming device 10 that is connected to the electronic apparatus 100. Accordingly, it is not necessary for a user to separately confirm the device information of the cloud server 200, and it is not necessary for the electronic apparatus 100 to additionally perform the conversion of the print data.

Although FIG. 1 illustrates that the cloud server 200 is connected to one electronic apparatus 100, the cloud server 200 may be connected to a plurality of electronic apparatuses 100. Further, although it is illustrated that the cloud server 200 is directly connected to the electronic apparatus 100, a router and other cloud servers may be positioned between the cloud server 200 and the electronic apparatus 100.

Further, although FIG. 1 illustrates that the electronic apparatus 100 is connected to one image forming device 10, the electronic apparatus 100 may be connected to a plurality of image forming devices 10. Further, although it is illustrated that the electronic apparatus 100 is directly connected to the image forming device 10, a router and other servers may be positioned between the electronic apparatus 100 and the image forming device 10.

Further, although FIG. 1 shows that the electronic apparatus 100 compares the device information pre-registered in the cloud server 200 with the device information of the image forming device connected to the electronic apparatus 100, such an operation may be performed by the cloud server 200.

FIG. 2 is a block diagram illustrating the detailed configuration of the electronic apparatus in FIG. 1.

Referring to FIG. 2, the electronic apparatus 100 may include a communication interface unit 110, a user interface unit 120, a storage unit 130, a search unit 140, an updating unit 150, a task management unit 160, and a control unit 170.

The communication interface unit 110 is connected to the cloud server 200. Specifically, the communication interface unit 110 is formed to connect the electronic apparatus 100 to an external device, and may be connected to the cloud server 200 not only through a LAN (Local Area Network) and the Internet but also through a wireless communication (for example, GSM, UMTS, LTE, or the like) method.

Further, the communication interface unit 110 is connected to at least one image forming device 10. Specifically, the communication interface unit 110 may be connected to the image forming device 10 not only by a wireless or wired method through the LAN and the Internet but also through a communication port, such as a USB (Universal Serial Bus) port.

Further, the communication interface unit 110 may search for a connectable image forming device. Specifically, the communication interface unit 110 may search for a connectable image forming device according to a discovery control of the search unit 140.

Further, the communication interface unit 110 may receive device information of the image forming device. Specifically, the communication interface unit 120 may request the connectable image forming device or the image forming device selected by the user interface unit 120 to be described later to transfer the device information and receive the device information of the corresponding device. Further, the communication interface unit 110 may transfer the received device information of the image forming device to the cloud server 200.

Additionally, the communication interface unit 110 may receive various kinds of lists from the cloud server 200. Specifically, the communication interface unit 110 may receive a document file list and a print option list that correspond to a user account from the cloud server 200. Further, the communication interface unit 110 may transfer selection information (for example, information on a print file of which a printing job is to be performed and information on a print option to be applied to the print file) that is selected by a user from the received list and information on the image forming device to perform the printing job to the cloud server 200.

Further, the communication interface unit 110 may transfer the document file to the cloud server 200. Further, the communication interface unit 110 may receive the print data from the cloud server 200. Here, the print data is a file type of which direct printing is possible, and may be a web page file, a PDF file, or an image file.

In addition, the communication interface unit 110 may transfer the print data to the image forming device 10. Specifically, the communication interface unit 110 may transfer the print data that is received from the cloud server 200 to the image forming device 10.

The user interface unit 120 is provided with a plurality of function keys through which the user may set/select various kinds of functions supported by the electronic apparatus 100, and may display various kinds of information provided by the electronic apparatus 100. The user interface unit 120 may be implemented by a device that can perform input and output operations at the same time, such as a touchpad, or may be implemented by a device that is obtained through combination of a mouse and a monitor.

The user interface unit 120 may receive an input of an execution command of a print application. If a print application is driven according to such an execution command, the user interface unit 120 may display a user interface window to receive a selection of which of a document, an image, and a web page stored in the electronic apparatus 100 is to be printed or which of document files stored in the cloud server 200 is to be printed. Further, the user interface unit 120 may display a user interface window for receiving an input of a user account for connecting to the cloud server 200. Accordingly, the user may input its own account information through the user interface window.

Further, the user interface unit 120 may display document files stored in the cloud server 200 that corresponds to the user account. Specifically, in the case where information on the user account that is input by the user is transferred to the cloud server 200 and a document file list that corresponds to the user account is received from the cloud server 200, the user interface unit 120 may display the received document file list. According to at least one exemplary embodiment, the electronic apparatus 100 generates and displays the user interface window using the information received from the cloud server 200. However, the cloud server 200 may generate the user interface window and the electronic apparatus 100 may receive and display the generated user interface window. The user interface window may be implemented in the form of a web page.

Further, the user interface unit 120 receives a selection of the document file of which the printing job is to be performed. Specifically, the user interface unit 120 may receive a selection of at least one of document files in the displayed print file list as the document file of which the printing job is to be performed.

Further, the user interface unit 120 receives a selection of the image forming device by which the printing job is to be performed. Specifically, the user interface unit 120 may display connectable image forming devices that are searched for by the search unit 140 to be described later, and receive a selection of the image forming device, by which the printing job is to be performed, of the displayed image forming devices. In other words, the user interface unit 120 may display connectable image forming devices that are searched for by the search unit 140, and may allow a user to select a desired image forming device to perform the desired print job.

Further, the user interface unit 120 may display a print option list. Specifically, the user interface unit 120 may display a directly generated print option list, or receive and display a print option list generated by the cloud server 200. For example, if the device information pre-registered in the cloud server 200 and the device information of the currently connected image forming device are equal to each other, the user interface unit 120 may display the print option list that is received from the cloud server 200 through the communication interface unit 110. The user interface may also receive a selection of at least one of the print options in the displayed print option list as the print option to be applied to the selected print file.

If the device information pre-registered in the cloud server 200 and the device information of the currently connected image forming device are different from each other, the user interface unit 120 may display the print option list that is generated by the task management unit 160 to be described later. Further, the user interface unit 120 may receive a selection of at least one of the print options in the displayed print option list as the print option to be applied to the selected print file.

The storage unit 130 stores document files. Specifically, the storage unit 130 may store document files prepared by a document preparation application, image files generated by an imaging application, and the like. Here, the stored files may be document files having extensions such as DOC and HWP, image files having extensions such as BMP and JPG, or files having extensions such as PDF.

Further, the storage unit 130 stores device information of the connected image forming devices. Further, the storage unit 130 may store device information pre-registered in the cloud server 200.

Further, the storage unit 130 stores print data. Specifically, the storage unit 130 may temporarily store print data received from the cloud server 200.

On the other hand, the storage unit 130 may be implemented by a storage medium in the electronic apparatus 100 or an external storage medium, for example, a removable disk including a USB memory or a web server through a network.

The search unit 140 searches for image forming devices connectable to the electronic apparatus. Specifically, the search unit 140 may search for surrounding image forming devices to which the electronic apparatus is connectable in a communication method that is supported by the electronic apparatus, such as WiFi, DLNA (Digital Living Network Alliance), or Bluetooth.

The updating unit 150 may receive the device information of the selected image forming device from the selected image forming device, and update the device information of the image forming device pre-registered in the cloud server using the received device information of the image forming device. In at least one exemplary embodiment, operation of updating the device information of the image forming device pre-registered in the cloud server may be performed automatically.

Specifically, the updating unit 150 unit may compare the pre-registered device information of the cloud server that is stored in the storage unit 130 with the device information of the image forming device 10 that intends to perform the current printing job, and if the device information of the selected image forming device is different from the device information pre-registered in the cloud server 200, transfer the device information of the selected image forming device to the cloud server 200, and change the device information pre-registered in the cloud server to the device information of the selected image forming device. In at least one exemplary embodiment, the transfer and change operations mentioned above may be automatically executed.

On the other hand, if the device information of the image forming device pre-registered in the cloud server 200 is not stored in the storage unit 130, the updating unit 150 may receive the pre-registered device information from the cloud server 200 and perform the above-described comparison operation. Further, such an updating operation may be performed even by the cloud server 200. Specifically, the electronic apparatus 100 may transfer the received device information of the image forming device to the cloud server 200, and the cloud server 200, which has received the device information, may update the pre-registered device information through comparison of the received device information with the pre-registered device information. In at least one exemplary embodiment, the cloud server may update the device information of the pre-registered image forming device.

The task management unit 160 manages printing jobs. Specifically, if a user selects a document file, of which the printing job is to be performed, through the user interface unit 120, the task management unit 160 may control the communication interface unit 110 to transfer the corresponding document file to the cloud server 200 in the case where the selected document file is the document file in the cloud server 200. If the selected document file is the document file in the cloud server 200, the task management unit 160 may request the cloud server 200 to convert the corresponding document file into print data.

Further, the task management unit 160 may receive a selection of a print option of the selected document file and transfer the selected print option to the cloud server 200.

Specifically, the task management unit 160 may control the user interface unit 120 to display a print option list that is applicable to the selected document file, receive a selection of the print option, which is to be applied to the selected document file, of the print options in the displayed print option list, and transfer the selected print option to the cloud server 200.

The print option list may be directly generated by the task management unit 160 or may be generated and transferred by the cloud server 200. For example, if the device information pre-registered in the cloud server 200 and the device information of the currently connected image forming device are equal to each other, the task management unit 160 may control the user interface unit 120 to display the print option list received from the cloud server 200 through the communication interface unit 110.

If the device information pre-registered in the cloud server 200 and the device information of the currently connected image forming device are different from each other, the task management unit 160 may generate a print option list that is applicable to the selected image forming device using the received device information of the image forming device 10 received through the communication interface unit 110, and control the user interface unit 120 to display the generated print option list.

Further, the task management unit 160 may transfer the print data to the image forming device 10. Specifically, if the print data that corresponds to the selected document file is received from the cloud server 200, the task management unit 160 may control the communication interface unit 110 to transfer the received print data to the selected image forming device 10.

The control unit 170 may control the respective constituent elements included in the electronic apparatus 100. Specifically, the control unit 170 receives a print application execution command through the user interface unit 120, drives a print application, and receives an input of the user account information through the user interface unit 120. Further, the control unit 170 may control the communication interface unit 110 to receive the document file list that corresponds to the input user account information.

If the document file list is received, the control unit 170 may control the user interface unit 120 to display the received document file list, and if at least one of the document files in the received document file list is selected, the control unit 170 may control the respective constituent elements included in the electronic apparatus 100 to perform the printing job of the selected document file.

As described above, the electronic apparatus 100 according to at least one exemplary embodiment updates the device information pre-registered in the cloud server 200 on the basis of the device information of the connected image forming device 10. Accordingly, it is not necessary for the user to separately confirm the device information of the cloud server 200, and it is not necessary for the electronic apparatus 100 to additionally perform the conversion of the print data.

FIG. 3 is a block diagram illustrating the detailed configuration of a cloud server in FIG. 1.

Referring to FIG. 3, a cloud server 200 includes a communication interface unit 210, a user interface unit 220, a storage unit 230, a printer management unit 240, a UI management unit 250, a print data generation unit 260, and a control unit 270.

The communication unit 210 is formed to be connected to at least one electronic apparatus 100, and may be connected to the electronic apparatus 100 not only through a LAN (Local Area Network) and the Internet but also through a wireless communication (for example, GSM, UMTS, LTE, or the like) method.

Further, the communication interface unit 210 receives device information of the image forming device. Specifically, the communication interface unit 210 may receive the device information of the image forming device from the electronic apparatus 100.

Additionally, the communication interface unit 210 may transfer various kinds of lists. Specifically, the communication interface unit 210 may transfer a document file list and a print option list that correspond to a user account.

Further, the communication interface unit 210 may receive selection information (for example, information on a print file of which a printing job is to be performed and information on a print option to be applied to the print file) that is selected by the user from the received list and information on the selected image forming device.

In addition, the communication interface unit 210 may receive the document file. Further, the communication interface unit 210 may transfer the print data generated by the print data generation unit 260 to be described later to the electronic apparatus 100. According to at least one exemplary embodiment, the generated print data is transferred to the image forming device through the electronic apparatus 100. However, in the case where the cloud server 200 and the image forming device 10 can be directly connected to each other, the communication interface unit 210 may directly transfer the generated print data to the image forming device 10.

The user interface unit 220 may be provided with a plurality of function keys through which the user can set or select various kinds of functions supported by the cloud server 200, and may display various kinds of information provided by the cloud server 200. The user interface unit 220 may be implemented by a device that can perform input and output operations at the same time, such as a touchpad, or may be implemented through combination of an input device such as a mouse or a keyboard and a display device such as a CRT monitor, an LCD monitor, or an LED.

The storage unit 230 stores document files. Specifically, the storage unit 230 may store document files received from the electronic apparatus 100. Here, the stored files may include, but are not limited to, document files having extensions such as DOC and HWP, image files having extensions such as BMP and JPG, and files having extensions such as PDF.

Further, the storage unit 230 stores pre-registered device information. Further, the storage unit 230 stores print data.

Specifically, the storage unit 230 may temporarily store the generated print data in the print data generation unit 260 to be described later.

On the other hand, the storage unit 230 may be implemented by a storage medium in the cloud server 200 or an external storage medium, for example, a removable disk including a USB memory or a file server through a network.

The printer management unit 240 manages the device information that corresponds to the user account. Specifically, the printer management unit 240 may store the device information of the image forming device pre-registered of the user account, and update the pre-registered device information using the received device information of the image forming device that is received through the communication interface unit 120.

Further, if login information is received from the electronic apparatus 100, the printer management unit 240 may confirm whether the corresponding user is a registered user using the user account information pre-stored in the storage unit 230, and control the communication interface unit 210 to transfer the document file list that corresponds to the corresponding user account with respect to the authenticated user.

The UI management unit 250 generates the document file list that corresponds to the user account of the electronic apparatus. Specifically, the UI management unit 250 may generate the list of document files that corresponds to the user account of the electronic apparatus 100. At this time, the UI management unit 250 may generate information having only the document file list that corresponds to the user account and generate a UI having the corresponding information.

Further, the UI management unit 250 generates an applicable print option list on the basis of the pre-registered device information of the image forming device. Specifically, if the received device information and the pre-registered device information are equal to each other, the UI management unit 250 may generate the applicable print option list on the basis of the pre-registered device information of the image forming device. If the received device information and the pre-registered device information are different from each other, the UI management unit 250 may generate the applicable print option list using the device information updated with the received device information. At this time, the UI management unit 250 may generate information having only the print option list and generate a UI having the corresponding information.

The print data generation unit 260 generates print data of the document file. Specifically, the print data generation unit 260 may convert the selected document file into at least one of a web page file, a PDF file, and an image file. On the other hand, if the print option information to be applied to the selected document file is received from the electronic apparatus 100, the print data generation unit 260 may generate the print data of the document file through reflection of the received print option information.

The control unit 270 may control the respective constituent elements included in the cloud server 200. Specifically, if the document file to be printed of the document files that are stored from the electronic apparatus 100 to the cloud server 200 is selected, the control unit 270 may control the print data generation unit 260 and the communication interface unit 210 to generate and transfer the print data of the selected document file to the electronic apparatus 100.

Further, if the device information of the image forming device that is received through the communication interface unit 210 and the pre-registered device information of the image forming device are different from each other, the control unit 270 may control the printer management unit 240 to update the pre-registered device information of the image forming device with the received device information of the image forming device.

As described above, the cloud server 200 according to at least one exemplary embodiment updates the pre-registered device information on the basis of the device information of the connected image forming device 10. Accordingly, it is not necessary for the user to separately confirm and/or change the device information of the cloud server 200, and the cloud server 200 can generate the print data through applying a print option that is suitable for the connected image forming device.

FIG. 4 is a sequence diagram illustrating the operation of a printing system according to a first embodiment.

Referring to FIG. 4, the electronic apparatus 100 drives a print application to perform a printing job (S401), and if a user selects a cloud print of various kinds of printing methods (for example, image file printing, web page printing, PDF file printing, and cloud printing) (S403), the electronic apparatus 100 may receive an input of account information to connect to the cloud server 200 (S405).

If the account information is input, the electronic apparatus 100 may transfer the account information to the cloud server 200 (S407), and the cloud server 200, which has received the input of the account information, may authenticate a user using the received account information (S409), generate a document file list UI that corresponds to the authenticated user account (S411), and transfer the generated document file list UI to the electronic apparatus 100 (S413). According to at least one exemplary embodiment, the cloud server 200 generates and provides a UI to be displayed on the electronic apparatus 100. However, the cloud server 200 may provide only the document file information that corresponds to the user account to the electronic apparatus 100, and the electronic apparatus 100 may generate the UI using the received information.

The electronic apparatus 100, which has received the document file list UI, displays the received document file list (S415), receives a selection of the document file, of which the printing job is to be performed, of the document files in the displayed document file list (S417), and transfers information on the selected document file (S419).

The cloud server 200, which has received the information on the selected document file, drives a virtual printer driver (S421), and requests a discovery to search for the image forming device that is connectable to the electronic apparatus 100 through the driven virtual printer driver from the electronic apparatus 100 (S423).

The electronic apparatus 100, from which the discovery has been requested, may search for the connectable image forming device (S425). At this time, the electronic apparatus 100 may confirm whether the printing is possible with respect to the searched image forming devices 10 (S427 and S429), and search for the printable image forming device as the connectable image forming device. In at least one exemplary embodiment, the search may be conducted to search for only the printable image forming device as the connectable image forming device.

If the connectable image forming device is searched for, the electronic apparatus 100 may display the searched image forming device (S431), and receive a selection of the image forming device by which the printing job is to be performed (S433).

If the image forming device, by which the printing job is to be performed, is selected, the electronic apparatus 100 may request the device information from the selected image forming device 10 (S435), and receive the device information from the selected image forming device 10 (S437). According to at least one exemplary embodiment, if the image forming device is selected, the electronic apparatus 100 requests and receives the device information of the selected image forming device from the image forming device 10. However, in the discovery process (S425), the device information of all connectable image forming devices may be requested and received in advance.

Next, the electronic apparatus 100 transfers the received device information to the cloud server 200 (S439). The cloud server 200, which has received the device information, may perform updating of the pre-registered device information through comparison of the pre-registered device information with the received device information (S441), generate a print option UI that is applicable to the selected image forming device (S443), and transfer the generated print option UI to the electronic apparatus 100 (S445). In at least one exemplary embodiment, the cloud server 200 generates and provides the print option UI to be displayed on the electronic apparatus 100. However, the cloud server 200 may provide only the print option information of the selected image forming device to the electronic apparatus 100, and the electronic apparatus 100 may generate the UI using the received information.

The electronic apparatus 100, which has received the print option UI, displays the received print option UI (S447), and receives a selection of the print option, which is to be applied to the selected document file, of the print options in the displayed print option UI (S449). If the print option to be applied to the selected document file is selected, the electronic apparatus 100 may transfer the selected print option to the cloud server 200 (S451).

Next, the cloud server 200 generates the print data on the basis of the selected print option and the selected document file (S453), and transfers the generated print data to the electronic apparatus 100 (S455).

The electronic apparatus 100, which has received the print data, transfers the received print data to the selected image forming device 10 (S457), and the image forming device prints the received print data (S459).

As described above, according to at least one exemplary embodiment, the cloud server 200 determines whether to perform the updating of the device information pre-registered in the cloud server 200. However, the determination of whether the updating is necessary may be performed by the electronic apparatus 100. This example will now be described with reference to FIG. 5.

FIG. 5 is a sequence diagram illustrating the operation of a printing system according to an exemplary embodiment where the electronic apparatus 100 determines whether to perform the above-mentioned updating operation.

Referring to FIG. 5, the electronic apparatus 100 drives a print application to perform a printing job (S501). If a user selects a cloud print of various kinds of printing methods (for example, image file printing, web page printing, PDF file printing, and cloud printing) (S503), the electronic apparatus 100 may receive an input of account information to connect to the cloud server 200 (S505).

If the account information is input, the electronic apparatus 100 may transfer the account information to the cloud server 200 (S507), and the cloud server 200, which has received the input of the account information, may authenticate a user using the received account information (S509). Thereafter, the cloud server 200 generates a document file list UI that corresponds to the authenticated user account (S511), and transfers the generated document file list UI to the electronic apparatus 100 (S513).

The electronic apparatus 100, which has received the document file list UI, displays the received document file list (S515), receives a selection of the document file, of which the printing job is to be performed, of the document files in the displayed document file list (S517), and transfers information on the selected document file (S519).

The cloud server 200, which has received the information on the selected document file, drives a virtual printer driver (S521), and requests a discovery to search for the image forming device that is connectable to the electronic apparatus 100 through the driven virtual printer driver from the electronic apparatus 100 (S523).

The electronic apparatus 100, from which the discovery has been requested, may search for the connectable image forming device (S525). At this time, the electronic apparatus 100 may confirm whether the printing is possible with respect to the searched image forming devices 10 (S527 and S529), and search for the printable image forming device as the connectable image forming device. As mentioned above, in at least one exemplary embodiment, the search may directed to searching only the printable image forming device as the connectable image forming device. However, the present general inventive concept is not limited thereto.

If the connectable image forming device is searched for, the electronic apparatus 100 may display the searched image forming device (S531), and receive a selection of the image forming device by which the printing job is to be performed (S533).

If the image forming device, by which the printing job is to be performed, is selected, the electronic apparatus 100 may request the device information from the selected image forming device 10 (S535), and receive the device information from the selected image forming device 10 (S537).

Further, the electronic apparatus 100 may request and receive the pre-registered device information from the cloud server 200 (S541 and S543). According to at least one exemplary embodiment, the electronic apparatus 100 requests and receives the pre-registered device information from the cloud server 200. However, this step may be omitted in the case where the device information pre-registered in the cloud server 200 is stored in the electronic apparatus 100 in advance.

Further, the electronic apparatus 100 determines whether the updating of the device information pre-registered in the cloud server 200 is necessary through comparison of the device information pre-registered in the cloud server 200 with the device information of the selected image forming device (S545). If it is determined that the updating is necessary, the electronic apparatus 100 transfers the received device information of the image forming device to the cloud server 200 (S547), and the cloud server 200 updates the pre-registered device information using the received device information of the image forming device (S549).

Further, if the updating of the pre-registered device information is necessary, the electronic apparatus 100 displays a print option UI that is applicable to the selected image forming device on the basis of the received device information (S551), receives a selection of the print option, which is to be applied to the selected document file, of the print options in the displayed print option UI (S533), and transfers the selected print option information to the cloud server (S555).

Next, the cloud server 200 generates the print data on the basis of the selected print option and the selected document file (S557), and transfers the generated print data to the electronic apparatus 100 (S559).

The electronic apparatus 100, which has received the print data, transfers the received print data to the selected image forming device 10 (S561), and the image forming device prints the received print data (S563).

FIG. 6 is a diagram illustrating an example of device information according to an exemplary embodiment of the present general inventive concept.

Referring to FIG. 6, the device information according to at least one exemplary embodiment includes information on the electronic apparatus 100. The information includes, but is not limited to, user information, color printing information of the image forming device, print tray information, duplex printing information, hard disk drive information, paper size information, stapler information, model information of the image forming device, and the like.

Figure 7:
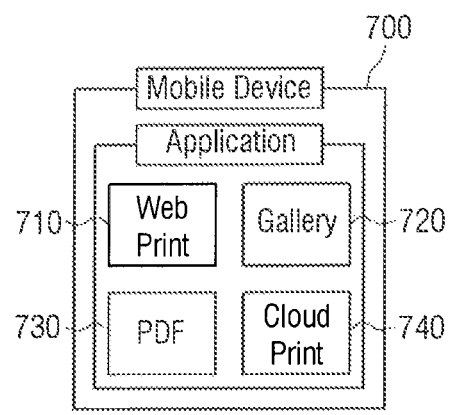
FIGS. 7 to 9 are diagrams illustrating various examples of user interface windows that can be displayed on an electronic apparatus in FIG. 1.
Figure 8:
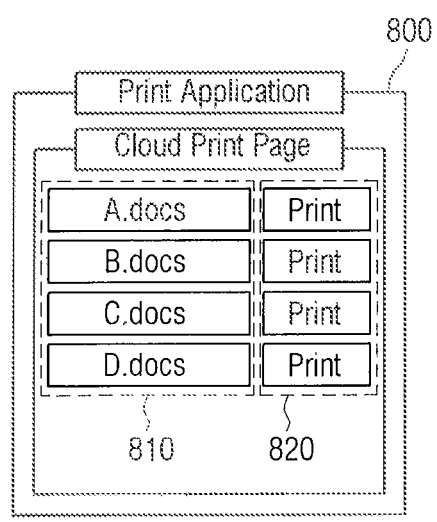
Figure 9:
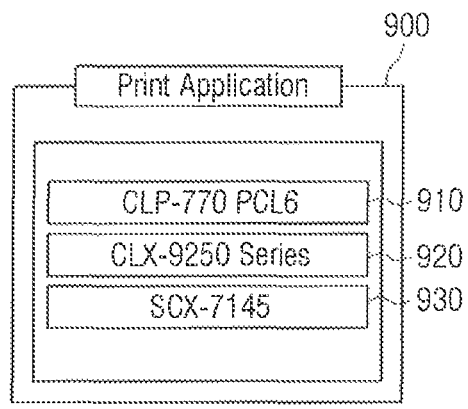

FIGS. 7 to 9 are diagrams illustrating various examples of user interface windows that can be displayed on an electronic apparatus in FIG. 1.

Referring to FIG. 7, if a print application is driven, a user interface window 700 includes a plurality of regions 710, 720, 730, and 740 to receive a selection of various printing methods.

The first region 710 is a region to receive an input of a print command of a web page.

The second region 720 is a region to receive an input of a print command of an image file that is stored in the electronic apparatus 100.

The third region 730 is a region to receive an input of a print command of a PDF file that is stored in the electronic apparatus 100.

The fourth region 740 is a region to receive an input of a print command of a document file that is stored in the cloud server 200.

If the user selects the fourth region, a login operation to connect to the cloud server 200 is performed, and a user interface window as shown in FIG. 8 may be displayed with respect to an authenticated user.

Referring to FIG. 8, a user interface window 800 displays a plurality of document files that are stored in the cloud server 200. Specifically, the user interface window 800 includes a fifth region 810 and a sixth region 820.

The fifth region 810 is a region to display a document file, which corresponds to a user account, of document files stored in the cloud server 200.

The sixth region 820 is a region to receive a selection of a document file, of which the printing job is to be performed, of document files displayed on the fifth region.

If the user selects a document file, of which the printing job is to be performed, on the sixth region, the electronic apparatus 100 transfers information on the selected document file to the cloud server 200, performs the discovery operation, which may include searching for the image forming device by which the printing job is to be performed, and displays the searched image forming device as shown in FIG. 9.

Referring to FIG. 9, a user interface window 900 displays connectable image forming devices 910, 920, and 930. The user can select the image forming device, by which the printing job is to be performed, of the displayed image forming devices.

Figure 10:
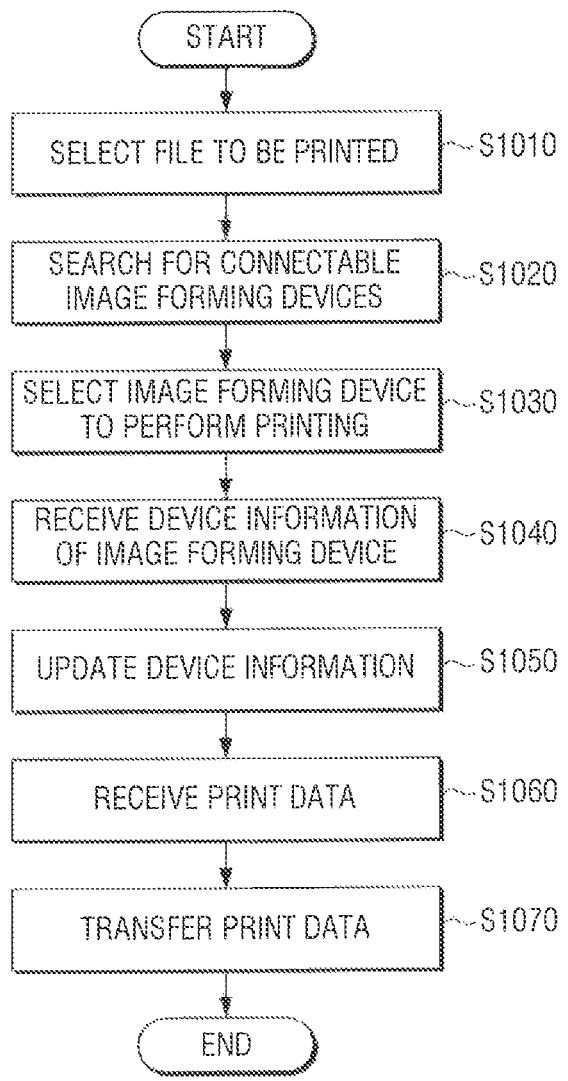
FIG. 10 is a flowchart illustrating a method to control printing in an electronic apparatus according to an exemplary embodiment of the present general inventive concept.

FIG. 10 is a flowchart illustrating a method of controlling printing in an electronic apparatus according to an exemplary embodiment of the present general inventive concept.

Referring to FIG. 10, the electronic apparatus receives a selection of a document file, of which a printing job is to be performed, among one or more document files stored in the cloud server (S1010). Specifically, if the user account information input by the user is transferred to the cloud server 200 and a document file list that corresponds to the user account is received from the cloud server 200, the electronic apparatus may display the received document file list. For example, a user may select a desired document file stored in the cloud server, and the cloud server may receive a selection of the document file, of which the printing job is to be performed, among one or more of the document files in the displayed document file list.

Then, the electronic apparatus searches for connectable image forming devices (S1020). Specifically, the electronic apparatus may search for and/or detect the surrounding image forming devices that are connectable in a communication method supported by the electronic apparatus, such as WiFi, DLNA, Bluetooth, or the like.

Then, the electronic apparatus receives a selection of the image forming device, by which the printing job is to be performed, of the searched image forming devices (S1030). Specifically, the electronic apparatus may display the searched connectable image forming devices and receive a selection of the image forming device, by which the printing job is to be performed, of the displayed image forming devices. A user, for example, may select a desired image forming device among the displayed image forming devices to perform the print job.

Then, the electronic apparatus receives device information of the selected image forming device (S1040). Here, the device information is information related to functions of the image forming device.

Then, the electronic apparatus updates device information of image forming devices pre-registered in the cloud server using the received device information of the image forming device (S1050). Specifically, the electronic apparatus may compare the pre-registered device information of the cloud server that is pre-stored in the electronic apparatus 100 with the device information of the image forming device 10 by which the current printing job is to be performed, and if the device information of the selected image forming device is different from the device information pre-registered in the cloud server 200, the electronic apparatus may transfer the device information of the selected image forming device to the cloud server 200, and change the device information pre-registered in the cloud server to the device information of the selected image forming device. On the other hand, if the device information pre-registered in the cloud server 200 is not stored in the electronic apparatus 100, the electronic apparatus may receive the device information pre-registered in the cloud server 200 and perform the comparison operation as described above.

Then, the electronic apparatus receives print data of the selected document file from the cloud server (S1060). Here, the print data is a file type of which direct printing is possible. For example, the file type may include, but is not limited to, a web page file, a PDF file, and an image file.

Then, the electronic apparatus transfers the received print data to the selected image forming device (S1070). Specifically, the electronic apparatus may transfer the received print data to the image forming device and perform the printing job using the direct printing method.

As described above, the method to control printing in an electronic apparatus according to at least one exemplary embodiment updates the device information pre-registered in the cloud server 200 on the basis of the device information of the connected image forming device 10. Accordingly, it is not necessary for the user to separately confirm the device information of the cloud server 200, and it is not necessary for the electronic apparatus 100 to additionally perform the conversion of the print data. The method to control printing as shown in FIG. 10 may be performed by the electronic apparatus having the configuration illustrated in FIG. 2, and may be executed by an electronic apparatus having a different configuration.

Further, the method to control printing in an electronic apparatus as described above may be implemented by at least one execution program to execute the method of controlling printing in an electronic apparatus as described above, and such an execution program may be stored in a computer readable recording medium.

Accordingly, respective blocks according to the present general inventive concept may be performed as computer recordable codes on the computer readable recording medium. The computer readable recording medium may be a device capable of storing data that can be read by a computer system.

Figure 11:
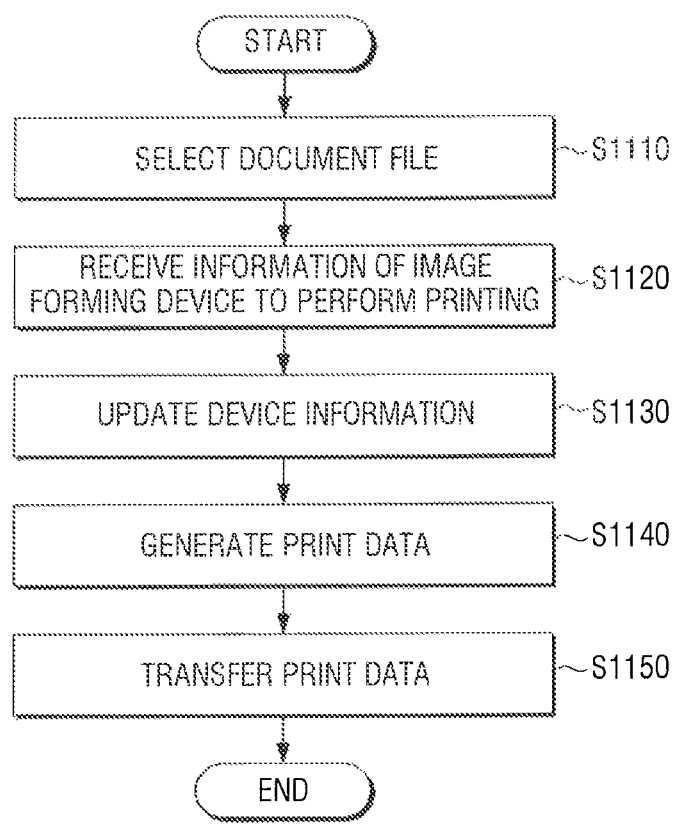
FIG. 11 is a flowchart illustrating a method to control printing in a cloud server according to an exemplary embodiment of the present general inventive concept.

FIG. 11 is a flowchart illustrating a method to control printing in a cloud server according to an exemplary embodiment of the present general inventive concept.

Referring to FIG. 11, the cloud server first receives a selection of a document file, of which a printing job is to be performed, among one or more document files pre-stored in the cloud server from the electronic apparatus (S1110). Specifically, the cloud server may receive user account information from the electronic apparatus 100, generate a document file list that corresponds to the received user account information, transfer the generated document file list to the electronic apparatus 100, and receive a selection of at least one of the document files in the transferred document file list as the document file of which the printing job is to be performed.

Then, the cloud server receives device information of image forming devices that are connectable to the electronic apparatus (S1120). Here, the device information is information related to functions of the image forming device 100, and may be information as illustrated in FIG. 6.

Then, the cloud server updates the pre-registered device information using the received device information of the image forming device (S1130). Specifically, if the received device information of the image forming device is different from the device information pre-registered in the cloud server 200, the cloud server may change the pre-registered device information to the received device information of the image forming device.

Then, the cloud server generates print data of the selected document file using the updated device information (S1140). Specifically, the cloud server may convert the selected document file into at least one of a web page file, a PDF file, and an image file. On the other hand, if print option information is received from the electronic apparatus, the cloud server may generate the print data through reflection of the received print option information.

Then, the cloud server transfers the generated print data to the electronic apparatus (S1150).

As described above, the method to control printing in a cloud server according to at least one exemplary embodiment updates the pre-registered device information on the basis of the device information of the connected image forming device 10. Accordingly, it is not necessary for the user to separately confirm and/or change the device information of the cloud server 200. Further, the cloud server 200 may generate the print data by applying a print option that is suitable for the connected image forming device. The method to control printing in the cloud server as shown in FIG. 11 may be performed by the cloud server having a configuration of the exemplary embodiment illustrated in FIG. 3. However, the configuration of the cloud server is not limited thereto, and may be executed by a cloud server having a different configuration.

Further, the method to control printing in a cloud server as described above may be implemented by at least one execution program to execute the method of controlling printing in a cloud server as described above, and such an execution program may be stored in a computer readable recording medium.

Figure 12:
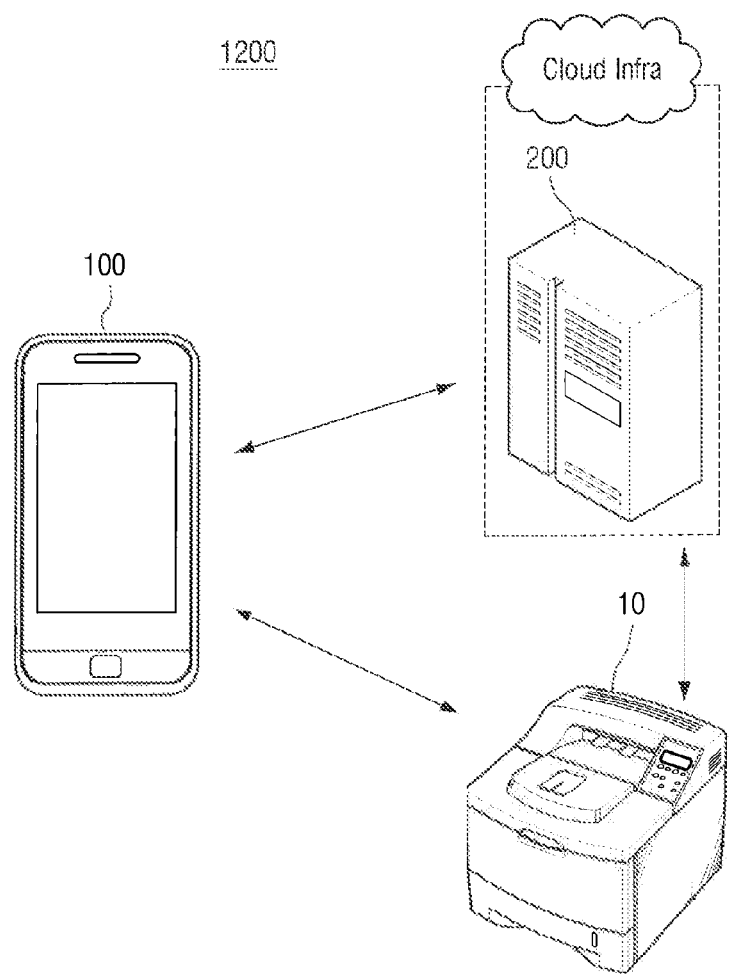
FIG. 12 is a diagram illustrating a printing system similar to the printing system of FIG. 1 according to an exemplary embodiment of the present general inventive concept.

Referring now to FIG. 12, an exemplary printing system 1200 similar to the printing system 1000 of FIG. 1 is illustrated. Accordingly to at least one exemplary embodiment illustrated in FIG. 12, the printing system 1200 includes an image forming device 10, an electronic apparatus 100, and a cloud server 200. The electronic apparatus 100 is capable of communicating with each of the image forming device 10 and the cloud server 200. Further, the electronic apparatus 100 is capable of determining the locations and/or addresses of each of the image forming device 10 and the cloud server 200. Accordingly, the electronic apparatus may generate a cloud location signal (e.g. source signal) and/or an image forming device location signal (e.g., destination signal), indicating the locations and/or addresses of the cloud server 200 and the image forming device 10, respectively.

The cloud server 200 includes a storage unit to store at least one data file, and a communication interface unit 210 to electrically communicate with an external device including, but not limited to, the electronic apparatus 100.

Figure 13:
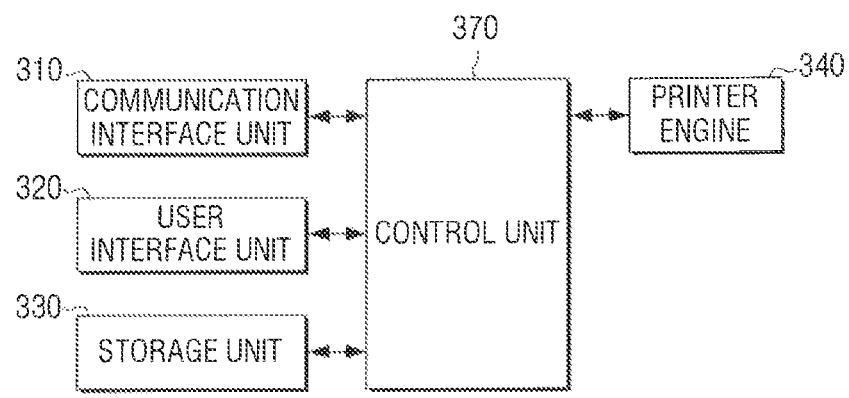
FIG. 13 is a block diagram illustrating a detailed configuration of an image forming device according to an exemplary embodiment of the present general inventive concept.

Referring to FIG. 13, the image forming device 10 may include a communication interface 310, a user interface 320, a storage unit 330, a printer engine 340, and a control unit 370. The storage unit 330 may store various data including, but not limited to, data files to be printed and device information. The communication interface 310 allows the image forming device 10 to communicate with an external device. For example, the image forming device 10 may electrically communicate with each of the electronic apparatus 100 and the cloud server 200. The communication interface 310 may include a wired communication interface and/or a wireless communication interface including, but not limited to, a WiFi interface, a DLNA (Digital Living Network Alliance) interface, and a Bluetooth interface. The control unit 370 may control the communication interface 310, the user interface 320, the storage unit 330, and the printer engine 340. For example, the control unit 370 may control the printer engine 340 to execute printing of print data received from the communication interface 310, as discussed further below.

In at least one exemplary embodiment illustrated in FIG. 12, the electronic apparatus 100 may determine a source location/address of the cloud server 200. For example, the electronic apparatus 100 may be directly associated with cloud server 200 such that a source of cloud server, i.e., a location, an IP address, a universal resource locator (URL), RSS feed source etc., may be easily determined. For example, a user of the electronic apparatus 100 may also be associated with a cloud server 200. Hence the user may register the electronic apparatus 100 with the cloud server 200 such that the electronic apparatus 100 is easily aware of the location/address, i.e., source information of the cloud server 200. Accordingly, the electronic apparatus 100 may generate a source signal indicating the location/address of the cloud server 200, and may send the source signal to the image forming device 10.

The image forming device 10 may receive the source signal from the electronic apparatus 100 via the communication interface 310. Upon determining the location/address of the cloud server 200, the image forming device 10 may establish a communication link therewith, and may send device information corresponding to the image forming device 10 to the cloud server 200. In at least one exemplary embodiment, the image forming apparatus 10 automatically initiates the communication link with the cloud server 200 in response to receiving the source signal from the electronic apparatus 100.

Upon receiving the device information from the image forming device 10, the cloud server 200 may update the pre-registered device information, and may convert one or more data files selected via the electronic apparatus 100 into print data corresponding to the received device information. For example, the cloud network 200 may include a virtual printer driver that converts one or more data files selected into print data corresponding to the updated device information received from the image forming device 10. Accordingly, the data file may be converted into print data that is recognizable by the image forming device 10. After converting the data file into the print data, the cloud server 200 may send the print data to the image forming data 10, where it may be directly printed without further conversion by a print driver. Therefore, at least one exemplary embodiment illustrated in FIG. 12 allows the electronic apparatus 100 to direct the image forming device 10 and the cloud server 200 between one another such that a data file stored in the cloud server 200 may be directly printed at an image forming device 10, and may reduce data processing, data transmission and/or energy consumption by the electronic apparatus 100.

Accordingly, respective blocks according to the present general inventive concept may be performed as computer recordable codes on the computer readable recording medium. The computer readable recording medium may be a device capable of storing data that can be read by a computer system. In other words, the present general inventive concept may also be embodied as computer-readable codes on a computer-readable medium. The computer-readable medium may include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few exemplary embodiments of the present general inventive concept have been shown and described, it will be appreciated by those skilled in the art that changes may be made in these exemplary embodiments without departing from the principles and spirit of the present general inventive concept, the scope of which is defined in the appended claims and their equivalents.

What is claimed is:

1. An electronic apparatus that is connectable to a cloud server in which device information of image forming devices is pre-registered, comprising:
   a searching unit to search for the image forming devices to which the electronic apparatus is to be connected;
   a user interface unit to receive a selection of an image forming device, by which a printing job is to be performed, among the searched image forming devices, and to receive a selection of a document file, of which the printing job is to be performed, among document files stored in the cloud server;
   an updating unit to receive the device information of the selected image forming device from the selected image forming device, and to update the device information of the image forming devices pre-registered in the cloud server using the received device information of the image forming device; and
   a communication interface unit to receive print data of the selected document file from the cloud server, and to transfer the received print data to the selected image forming device.

2. The electronic apparatus of claim 1, wherein the print data is at least one of a web page file, a PDF (Portable Document Format) file, and an image file.

3. The electronic apparatus of claim 1, wherein the device information is information related to functions of the image forming device.

4. The electronic apparatus of claim 1, wherein the communication interface unit receives a document file list that corresponds to a user account of the electronic apparatus, and
   the user interface unit displays the received document file list and receives a selection of at least one of the document files in the displayed document file list as the document file of which the printing job is to be performed.

5. The electronic apparatus of claim 1, wherein the updating unit receives the device information pre-registered in the cloud server, compares the device information received from the selected image forming device with the pre-registered device information, and if the device information of the selected image forming device is different from the pre-registered device information, transfers the device information of the selected image forming device to the cloud server, and changes the device information pre-registered in the cloud server to the device information of the selected image forming device.

6. The electronic apparatus of claim 1, wherein the updating unit transfers the device information of the selected image forming device to the cloud server so that the cloud server updates the device information pre-registered in the cloud server according to the device information of the selected image forming device.

7. The electronic apparatus of claim 1, further comprising a task management unit to receive a selection of a print option to be applied to the selected document file and to transfer the selected print option to the cloud server.

8. The electronic apparatus of claim 7, wherein if a print option list that is applicable to the selected image forming device is received from the cloud server, the task management unit controls the user interface unit to display the received print option list, and receives a selection of at least one of print options in the displayed print option list as the print option to be applied to the selected document file.

9. The electronic apparatus of claim 7, wherein the task management unit controls the user interface unit to display the print option list that is applicable to the selected image forming device using the device information of the selected image forming device, and receives a selection of at least one of print options in the displayed print option list as the print option to be applied to the selected document file.

10. A cloud server which is connectable to an electronic apparatus and in which device information of image forming devices that correspond to the electronic apparatus is pre-registered, comprising:
    a storage unit to store document files;

a communication interface unit to receive from the electronic apparatus a selection of a document file, of which a printing job is to be performed, among the stored document files, and to receive the device information of the image forming devices that are connected to the electronic apparatus;

a printer management unit to update the pre-registered device information using the received device information of the image forming device;

a print data generation unit to generate print data of the selected document file using the updated device information; and a control unit to control the communication interface unit to transfer the generated print data of the selected document file to the electronic apparatus.

11. The cloud server of claim 10, wherein the print data generation unit converts the selected document file into at least one of a web page file, a PDF file, and an image file.

12. The cloud server of claim 10, wherein the device information is information related to functions of the image forming device.

13. The cloud server of claim 10, further comprising a UI generation unit to generate a document file list that corresponds to a user account of the electronic apparatus, wherein the communication interface unit transfers the generated document file list to the electronic apparatus and receives a selection of at least one of the document files in the transferred document file list as the document file of which the printing job is to be performed.

14. The cloud server of claim 10, wherein the printer management unit changes the pre-registered device information to the received device information of the image forming device if the received device information of the image forming device is different from the pre-registered device information.

15. The cloud server of claim 10, wherein the communication interface unit receives information on a print option to be applied to the selected document file, and the print data generation unit generates the print data through reflecting the received information on the print option therein.

16. The cloud server of claim 15, further comprising a UI management unit to generate an applicable print option list on the basis of the updated device information of the image forming device, wherein the communication interface unit transfers the generated print option list to the electronic apparatus and receives at least one of the print options in the transferred print option list as the print option to be applied to the selected document file.

17. A method to control printing in an electronic apparatus that is connected to a cloud server in which device information of image forming devices is pre-registered, comprising:

receiving a selection of a document file, of which a printing job is to be performed, of document files stored in the cloud server;

searching for the image forming devices to which the electronic apparatus is to be connected;

receiving a selection of an image forming device, by which the printing job is to be performed, of the searched image forming devices;

receiving the device information of the selected image forming device;

updating device information of an image forming device pre-registered in the cloud server using the received device information of the image forming device;

receiving print data of the selected document file from the cloud server; and transferring the received print data to the selected image forming device.

18. The method of claim 17, wherein the print data is at least one of a web page file, a PDF file, and an image file.

19. The method of claim 17, wherein the device information is information related to functions of the image forming device.

20. The method of claim 17, further comprising:

receiving a document file list that corresponds to a user account of the electronic apparatus; and displaying the received document file list and receiving a selection of at least one of the document files in the displayed document file list, wherein the step of receiving a selection of the document file comprises receiving at least one of the displayed document files as the document file of which the printing job is to be performed.

21. The method of claim 17, wherein the step of updating comprises:

receiving the device information pre-registered in the cloud server;

comparing the device information received from the selected image forming device with the pre-registered device information; and if the device information of the selected image forming device is different from the pre-registered device information, transferring the device information of the selected image forming device to the cloud server, and changing the device information pre-registered in the cloud server to the device information of the selected image forming device.

22. The method of claim 17, wherein the step of updating comprises transferring the device information of the selected image forming device to the cloud server so that the cloud server updates the device information pre-registered in the cloud server according to the device information of the selected image forming device.

23. The method of claim 17, further comprising:

receiving a selection of a print option to be applied to the selected document file; and transferring the selected print option to the cloud server.

24. The method of claim 23, further comprising:

receiving a print option list that is applicable to the selected image forming device from the cloud server; and displaying the received print option list, wherein the step of receiving a selection of the print option comprises receiving a selection of at least one of the print options in the displayed print option list as the print option to be applied to the selected document file.

25. The method of claim 23, further comprising displaying the print option list that is applicable to the selected image forming device using the received device information of the image forming device, wherein the step of receiving a selection of the print option comprises receiving a selection of at least one of the print options in the displayed print option list as the print option to be applied to the selected document file.

26. A method to control printing in a cloud server which is connected to an electronic apparatus and in which device information of image forming devices that correspond to the electronic apparatus is pre-registered, comprising:

receiving a selection of a document file, of which a printing job is to be performed, of document files pre-stored in the cloud server from the electronic apparatus;

receiving the device information of image forming devices that are connected to the electronic apparatus;

updating pre-registered device information using the received device information of the image forming device;

generating print data of the selected document file using the updated device information; and transferring the generated print data to the electronic apparatus.

27. The method of claim 26, wherein the step of generating the print data comprises converting the selected document file into at least one of a web page file, a PDF file, and an image file.

28. The method of claim 26, wherein the device information is information related to functions of the image forming.device.

29. The method of claim 26, further comprising:

generating a document file list that corresponds to a user account of the electronic apparatus; and transferring the generated document file list to the electronic apparatus, wherein the step of receiving a selection of the document file comprises receiving a selection of at least one of the document files in the transferred document file list as the document file of which the printing job is to be performed.

30. The method of claim 26, wherein the step of updating comprises changing the pre-registered device information to the received device information of the image forming device if the received device information of the image forming device is different from the pre-registered device information.

31. The method of claim 26, further comprising receiving information on a print option to be applied to the selected document file, wherein the step of generating the print data comprises generating the print data through reflecting the received information on the print option therein.

32. The method of claim 31, further comprising:

generating an applicable print option list on the basis of the updated device information of the image forming device; and transferring the generated print option list to the electronic apparatus, wherein the step of receiving the information on the print option comprises receiving at least one of the print options in the transferred print option list as the print option to be applied to the selected document file.

33. A non-transitory computer readable recording medium including a program to execute a method of controlling printing in an electronic apparatus, wherein the method to control printing comprises:

receiving a selection of a document file, of which a printing job is to be performed, of document files stored in a cloud server;

searching for image forming devices that are connected to the electronic apparatus;

receiving a selection of an image forming device, by which the printing job is to be performed, of the searched image forming devices;

receiving device information of the selected image forming device;

updating device information of image forming devices pre-registered in the cloud server using the received device information of the image forming device;

receiving print data of the selected document file from the cloud server; and transferring the received print data to the selected image forming device.

34. A cloud server to communicate with an electronic apparatus and to store device information of at least one image forming device that communicates with the electronic apparatus, comprising:

a storage unit to store at least one document file;

a communication interface to receive a document selection signal from the electronic apparatus that selects a desired document file among the at least one document file and to receive updated device information from the electronic apparatus corresponding to a desired image forming device to print the desired document file; and a virtual printer driver module that converts the desired document file into print data according to the updated device information.

35. The cloud server of claim 34, wherein the at least one document file includes an external document file received from the electronic apparatus.

* * * * *

UNITED STATES PATENT AND TRADEMARK OFFICE
CERTIFICATE OF CORRECTION

PATENT NO. : 9,007,630 B2  Page 1 of 1
APPLICATION NO. : 13/667836
DATED : April 14, 2015
INVENTOR(S) : Chang-soo Park It is certified that error appears in the above-identified patent and that said Letters Patent is hereby corrected as shown below:

In the Claims

Claim 28, Column 25, Line 15-16:

Delete "forming.device." and insert --forming device.-- therefor.

Signed and Sealed this
Eighteenth Day of August, 2015

Michelle K. Lee
*Director of the United States Patent and Trademark Office*